(12) United States Patent
Shiiyama et al.

(10) Patent No.: US 10,217,010 B2
(45) Date of Patent: Feb. 26, 2019

(54) INFORMATION PROCESSING APPARATUS FOR REGISTRATION OF FACIAL FEATURES IN A COLLATION DATABASE AND CONTROL METHOD OF THE SAME

(71) Applicant: CANON KABUSHIKI KAISHA, Tokyo (JP)

(72) Inventors: Hirotaka Shiiyama, Yokohama (JP); Masahiro Matsushita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 15/225,031

(22) Filed: Aug. 1, 2016

(65) Prior Publication Data

US 2017/0039419 A1 Feb. 9, 2017

(30) Foreign Application Priority Data

Aug. 5, 2015 (JP) ................................ 2015-155391

(51) Int. Cl.
*G06K 9/00* (2006.01)

(52) U.S. Cl.
CPC ..... *G06K 9/00926* (2013.01); *G06K 9/00295* (2013.01)

(58) Field of Classification Search
CPC ... G06K 9/00926; G06K 9/00295; G06T 7/00
See application file for complete search history.

(56) References Cited

U.S. PATENT DOCUMENTS

| | | | | |
|---|---|---|---|---|
| 5,907,838 A | * | 5/1999 | Miyasaka | ........... G06F 17/3066 707/740 |
| 7,403,642 B2 | * | 7/2008 | Zhang | ............... G06F 17/30265 382/118 |

(Continued)

FOREIGN PATENT DOCUMENTS

| | | |
|---|---|---|
| JP | 2002-373332 A | 12/2002 |
| JP | 4697106 B2 | 6/2011 |

(Continued)

OTHER PUBLICATIONS

Murphy-Chutorian et al., "Head Pose Estimation for Driver Assistance Systems: A Robust Algorithm and Experimental Evaluation," in Proceedings of the 2007 IEEE Intelligent Transportation Systems Conference, Sep. 30-Oct. 3, 2007, pp. 709-714, Seattle, WA, USA.

*Primary Examiner* — Mia M Thomas
(74) *Attorney, Agent, or Firm* — Carter, Deluca, Farrell & Schmidt, LLP

(57) ABSTRACT

The present invention suppresses feature amounts of faces to be registered in a collation database, thereby preventing the collation database from being bloated. An information processing apparatus of the present invention includes an acquisition unit configured to acquire a video, a detection unit configured to detect at least one face of the same person from a plurality of frames of the acquired video, a classification unit configured to classify the detected faces into a plurality of predetermined groups, a selection unit configured to select, from the faces classified into the groups, not more than a first predetermined number of faces for each group, wherein the first predetermined number is an integer of not less than 2, and a registration unit configured to register feature amounts of the selected faces in a database.

15 Claims, 10 Drawing Sheets

(56) References Cited

U.S. PATENT DOCUMENTS

| | | | |
|---|---|---|---|
| 8,335,354 B2* | 12/2012 | Matsuo | G06F 17/30265 |
| | | | 382/118 |
| 8,605,957 B2 | 12/2013 | Mochizuki et al. | |
| 2014/0254940 A1 | 9/2014 | Shiiyama et al. | |
| 2015/0294187 A1 | 10/2015 | Sorakado et al. | |
| 2015/0302252 A1* | 10/2015 | Herrera | G06K 9/00617 |
| | | | 382/117 |
| 2015/0379368 A1 | 12/2015 | Shiiyama et al. | |
| 2016/0035082 A1* | 2/2016 | King | G06F 17/211 |
| | | | 348/135 |
| 2016/0284092 A1 | 9/2016 | Matsushita et al. | |
| 2016/0335512 A1* | 11/2016 | Bradski | G06K 9/00617 |
| 2017/0006215 A1* | 1/2017 | Leung | H04N 5/23219 |
| 2017/0039419 A1* | 2/2017 | Shiiyama | G06T 7/003 |
| 2017/0039750 A1* | 2/2017 | Tong | G06T 13/40 |
| 2017/0075993 A1* | 3/2017 | Matsushita | G06F 17/30793 |

FOREIGN PATENT DOCUMENTS

| | | |
|---|---|---|
| JP | 2012-037995 A | 2/2012 |
| JP | 5526955 B2 | 6/2014 |

* cited by examiner

FACE DIRECTION PATTERN NUMBERS

| 24 | 25 | 10 | 11 | 12 |
|----|----|----|----|----|
| 23 | 9  | 2  | 3  | 13 |
| 22 | 8  | 1  | 4  | 14 |
| 21 | 7  | 6  | 5  | 15 |
| 20 | 19 | 18 | 17 | 16 |

FIG. 4

| | CAMERA ID = 2   OBJECT ID = 00002 | | |
|---|---|---|---|
| | CAMERA ID = 1   OBJECT ID = 00001 | | |
| FRAME No. | POSITION & SIZE | FACE DIRECTION PATTERN No. | FEATURE AMOUNT |
| 12345 | $X_0, Y_0, W_0, H_0$ | 4 | $F_0$ |
| 12346 | $X_1, Y_1, W_1, H_1$ | 4 | $F_1$ |
| ⋮ | ⋮ | ⋮ | ⋮ |

| OBJECT ID | FEATURE AMOUNT | CAMERA ID | FRAME No., POSITION, SIZE |
|---|---|---|---|
| 00001 | XXXXXXX | 1 | XXXXXXXXX |
| 00002 | XXXXXXX | 1 | XXXXXXXXX |
| 00003 | XXXXXXX | 2 | XXXXXXXXX |
| ⋮ | ⋮ | ⋮ | ⋮ |

INFORMATION PROCESSING APPARATUS FOR REGISTRATION OF FACIAL FEATURES IN A COLLATION DATABASE AND CONTROL METHOD OF THE SAME

BACKGROUND OF THE INVENTION

Field of the Invention

The present invention relates to a technique of collating a person in an image.

Description of the Related Art

There is a conventionally known technique which detects a human face from each frame of a surveillance video, calculates an image feature amount from the face, stores the image feature amount in association with the video frame, and searches the stored images for a video matching a human face shown by a query image. For example, it is possible to form a query image of the face of a lost child, and find the child's face in stored images, thereby specifying the location and time from a video showing the child.

A method of registering all faces detected from all frames of a video is available, but the number image feature amounts to be stored is huge in this method. Therefore, it is possible to reduce image feature amounts to be registered by decreasing the processing frame rate by thinning frames. Since, however, the accuracy of face collation generally depends on the face direction, the probability of missed collation increases because a frame having a favorable face direction may be discarded by frame thinning.

Literature: Japanese Patent Laid-Open No. 2012-37995 is related to a face authentication system. The problems of this literature are: which image feature amount of new registration target person B must be registered with respect to preregistered person A; and how to perform high-accuracy collation. In a registration phase of this system, a moving image is captured, and, from the faces of person B extracted from a plurality of frames, a face suitable for registration and its image feature amount are determined. The face direction of person B detected from a video frame is discriminated, classification is performed based on each face direction, and similarity comparison is performed by round robin, thereby determining the threshold of a similarity for determining a face likelihood of the person. In addition, the image feature amount of the face in each face direction of person B is compared with that in the same face direction of person A. If the similarity is equal to or larger than the threshold, the image feature amount in that face direction of person B is not stored but discarded. This makes it possible to narrow down image feature amounts to those required to discriminate between the faces of persons A and B, reduce image feature amounts to be stored, and prevent deterioration of the discrimination accuracy.

It is, however, difficult to use the technique of this literature to search for a person from a surveillance video. This is so because when registering the face of a given person, the face must be collated with the faces of all already registered persons. This extremely increases the load on the registration process in a surveillance video in which a large number of persons appear.

SUMMARY OF THE INVENTION

The present invention has been made in consideration of the above problem, and provides a technique which suppresses feature amounts of faces to be registered in a collation database, thereby preventing the collation database from being bloated.

According to an aspect of the invention, there is provided an information processing apparatus comprising: an acquisition unit configured to acquire a video; a detection unit configured to detect at least one face of the same person from a plurality of frames of the acquired video; a classification unit configured to classify the detected face into one of a plurality of predetermined groups; a selection unit configured to select, from the faces classified into the groups, not more than a first predetermined number of faces for each group, wherein the first predetermined number is an integer of not less than 2; and a registration unit configured to register feature amounts of the selected faces in a database.

The present invention can suppress feature amounts of faces to be registered in a collation database, thereby preventing the collation database from being bloated.

Further features of the present invention will become apparent from the following description of exemplary embodiments (with reference to the attached drawings).

BRIEF DESCRIPTION OF THE DRAWINGS

FIG. 4 is a view showing the contents of object tracking information according to the embodiment;

DESCRIPTION OF THE EMBODIMENTS

Embodiments according to the present invention will be explained below with reference to the accompanying drawings. Note that each embodiment to be explained below shows an example in which the present invention is practically carried out, and is a practical embodiment of an arrangement described in the scope of claims.

First Embodiment

Figure 1:
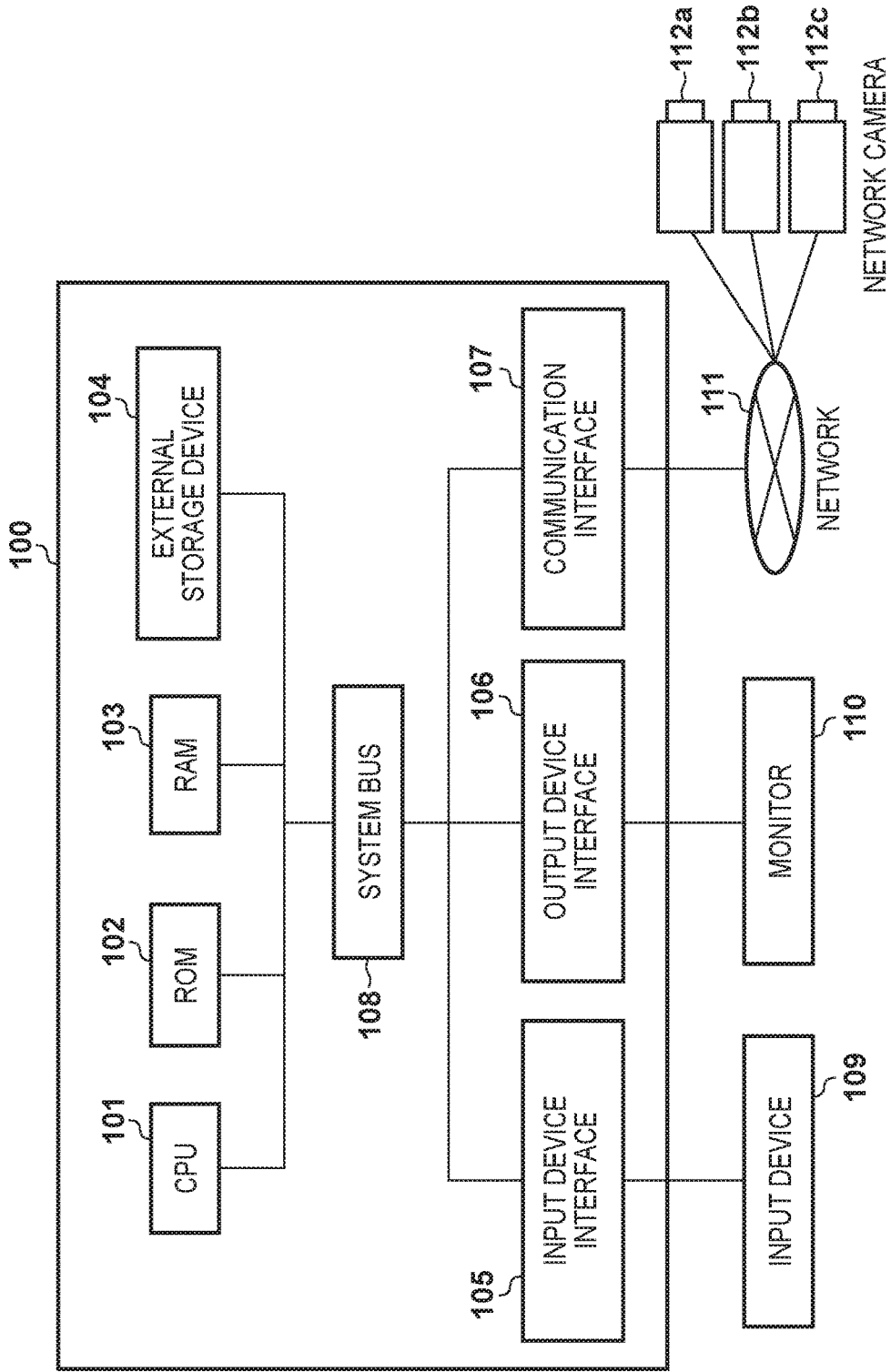
FIG. 1 is a block diagram of an apparatus of an embodiment.

FIG. 1 is a block diagram of an image collation apparatus 100 according to this embodiment. The apparatus 100 will be explained as an apparatus which functions as a server apparatus and client apparatus of image search. However, the server function and client function can also be implemented by independent apparatuses. In addition, the server apparatus can also be implemented by distributing processing to a plurality of computer apparatuses, instead of a single apparatus. When forming the server apparatus by using a plurality of computer apparatuses, they are connected by a LAN (Local Area Network) or the like so as to be communicable with each other. Each computer apparatus can be implemented by an information processing apparatus such as a PC (Personal Computer) or WS (Work Station).

Referring to FIG. 1, a CPU 101 is a central processing unit for controlling the whole image collation apparatus 100. A ROM 102 is a read only memory storing programs (BIOS and the like) requiring no change, and parameters. A RAM 103 is a random access memory for temporarily storing a program and data supplied from an external apparatus. An external storage device 104 is a large-capacity storage device such as a hard disk fixedly installed in the computer apparatus 100. The external storage device 104 stores an OS (Operating System) of this apparatus, an application for image collation, and a collation database (to be called a collation DB hereinafter) to be referred to when performing collation. The external storage device 104 also stores video data obtained by a video camera as will be described later.

An input device interface 105 is an interface for an input device 109, such as a pointing device or keyboard, which accepts a user's operation and inputs data. An output device interface 106 is an interface for a monitor 110 for displaying data held in the computer apparatus 100 and data supplied to it. A communication interface 107 is an interface for connecting the computer apparatus to a network 111 such as the Internet. Network cameras 112a to 112c are connected to the network 111. Note that camera IDs are assigned to the network cameras 112a to 112c. An explanation will be made by assuming that camera IDs 1, 2, and 3 are assigned to the network cameras 112a, 112b, and 112c. Note also that the number of connected network cameras need only be 1 or more, and can be any number. A system bus 108 is a transmission path connecting the units 101 to 107 so that they can communicate with each other.

When the power supply is turned on in the above configuration, the CPU 101 executes the BIOS program stored in the ROM 102, loads the OS (Operating System) onto the RAM 103 from the external storage device 104, and executes the OS. As a consequence, this apparatus functions as an information processing apparatus. That is, this apparatus functions as an image collation apparatus by executing a server program and client program for image collation from the external storage device 104 under the control of the OS.

Figure 2:
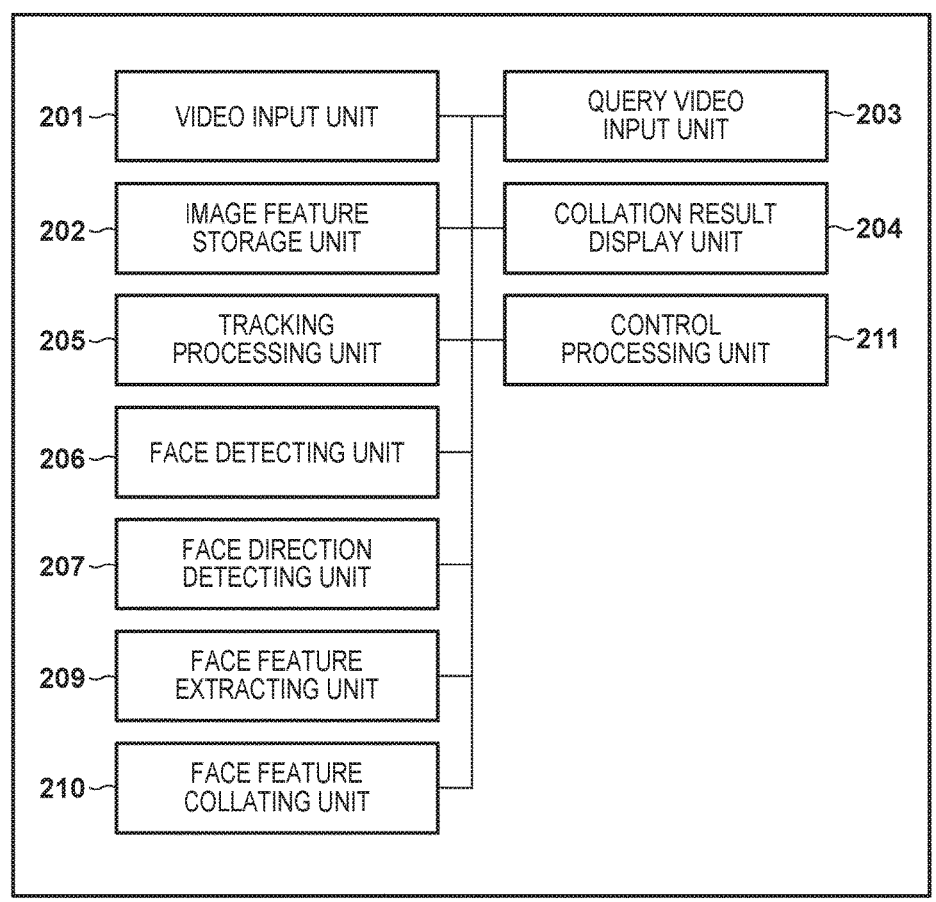
FIG. 2 is a functional diagram of the apparatus of the embodiment.

FIG. 2 is a functional block diagram of the video collation apparatus according to the embodiment. FIG. 2 is also a functional diagram when the CPU 101 executes the programs of both the search server and client functions.

A control processing unit 211 performs main processing for controlling processing units denoted by reference numerals 201 to 210.

A video input unit 201 receives video frames from the network cameras 112a to 112c via the communication interface 107, and stores the received frames in the external storage device 104. The input frame rate is, for example, 30 frames/sec. Consequently, moving image files of the network cameras 112a to 112c are formed in the external storage device 104. The video input unit 201 also supplies the received video frames to a face detecting unit 206.

The face detecting unit 206 performs face detection by using a face direction detecting unit 207 and a face feature extracting unit 209. The face feature extracting unit 209 detects a face region in each video frame, extracts a feature amount, and returns the feature amount to the face detecting unit 206. In this embodiment, an SIFT (Scale Invariant Feature Transform) feature amount of feature points of face components is obtained as the face image feature amount. When extracting the face feature amount, the face feature extracting unit 209 also returns, to the face detecting unit 206, the coordinates of the upper left corner of a bounding rectangle of the face region, and the size (a width W and a height H) of the bounding rectangle. Note that the coordinates of the lower right corner of the bounding rectangle can also be returned instead of the size.

The face direction detecting unit 207 detects the direction of the face detected by the face detecting unit 206, and returns information (a face direction pattern number) indicating the direction to the face detecting unit 206. Note that the technique of detecting the face direction of a person in an image is well known by the following literature, so a detailed description thereof will be omitted.

"Erik Murphy-Chutorian, "Head pose estimation for driver assistance systems: A robust algorithm and experimental evaluation," in Proc. IEEE Conf. Intelligent Transportation Systems, 2007, pp. 709-714."

Figures 3A, 3B:
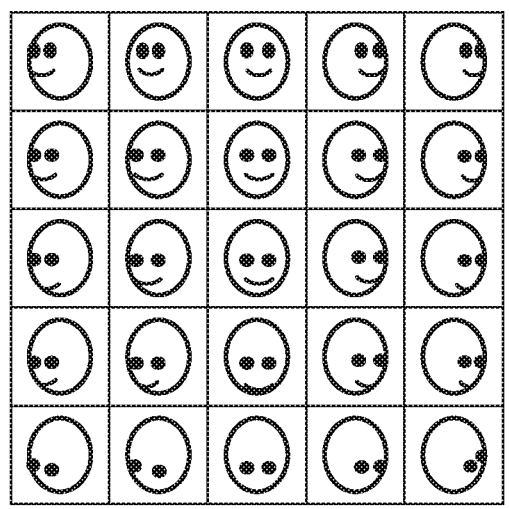
FIGS. 3A and 3B are views for explaining classification corresponding to face directions of the embodiment.

The face direction detecting unit 207 according to the embodiment determines to which of 5×5 patterns shown in FIG. 3A a face direction of interest corresponds. Note that FIG. 3A shows the 5×5 patterns, but this number can be any number. When the resolution of the network cameras is sufficiently high, the accuracy of the feature amount and direction increases, so the number of patterns can further be increased. In these patterns shown in FIG. 3A, the direction of a frontal face is positioned in the center, and the patterns are positioned farther from the central position as shift angles in the vertical and horizontal directions increase. In other words, the face direction patterns are so arranged that the closer to the center of the 5×5 patterns, the more frontal the face direction is. The accuracy of face collation increases when using a frontal face. That is, the central position of the 5×5 face directions has a highest priority order, and the priority order decreases in a direction away from the central position. FIG. 3B shows examples of the face direction pattern numbers. As shown in FIG. 3B, the face direction pattern number of a frontal face is "1". In addition, pattern numbers 2 to 9 are allocated around 1, and pattern numbers 10 to 25 are allocated outside 2 to 9. Note that face direction pattern numbers 2 to 9 need not always be arranged as shown in FIG. 3B. This similarly applies to face direction pattern numbers 10 to 25.

As explained above, from a video frame received from each of the network cameras 112a to 112c, the face detecting unit 206 obtains the position, size, feature amount, and face direction pattern number of the face of a person by using the face direction detecting unit 207 and face feature extracting unit 209.

Upon receiving tracking start instruction information from the control processing unit 211, a tracking processing unit 205 performs a tracking process in which a face designated in the present frame is a face as a tracking start target, and a corresponding face in subsequent frame images is tracked. The tracking start instruction information contains information (a camera ID) indicating a network camera having transmitted a frame image, information indicating the initial position of the tracking target face, and an object ID for specifying the face to be tracked. The object ID has an initial value of 1, and is incremented by 1 whenever the face to be tracked is found. Note that the process of tracking a person in an image can be performed by using, for example, a technique disclosed in Japanese Patent Laid-Open No. 2002-373332.

When receiving the above-mentioned tracking start instruction information, the tracking processing unit 205 generates object tracking information as shown in FIG. 4 on the RAM 103. One object tracking information is specified by the camera ID and object ID. Stored information contains a frame number (or time) when tracking start is instructed since the apparatus has started image recording of the day. The stored information further contains the position of the upper left corner and the size (width and height) of the bounding rectangle of the tracking target face in the corresponding video frame, the face direction pattern number, and the feature amount of the face. As these pieces of information, pieces of information from the face direction detecting unit 207 and face feature extracting unit 209 are used.

As long as video frames are sequentially input and the corresponding face is being successfully tracked, the tracking processing unit 205 adds the frame number, position, size, face direction pattern number, and feature amount explained above to the corresponding object tracking information. If tracking becomes impossible, the tracking processing unit 205 notifies the control processing unit 211 of the termination of tracking of the corresponding object ID. Note that tracking becomes impossible when the face cannot be recognized any more, for example, when (the face of) a person currently being tracked moves outside the field range of the camera, or when the person looks back.

Upon receiving the notification of tracking termination, the control processing unit 211 transfers the corresponding object tracking information to an image feature storage unit 202, and causes the image feature storage unit 202 to perform a storage process (registration process) on the collation DB. Details of the image feature storage unit 202 will be described later. When the registration process is complete, the control processing unit 211 erases the registered object tracking information from the RAM 103.

Note that a person having moved outside the field range of the camera may move inside the field range of the camera again. The apparatus of the embodiment does not determine whether a person having moved outside the field of the camera and a person having moved inside the field again are the same person. Therefore, a new object ID is issued for the face of a person having moved inside the field range of the camera again, thereby starting tracking. Accordingly, the tracking processing unit 205 performs the tracking process on all objects recognized as faces in the imaging field range of the camera. Therefore, the number of generated object tracking information shown in FIG. 4 is equal to the number of faces presently being tracked. The number of face regions having sizes recognizable as faces is at most about 40 to 50 in the visual field of one network camera. Although the number of network cameras is 3, only a maximum of 150 faces are tracking targets, and this number can sufficiently be processed by a present computer.

Figures 6, 7:
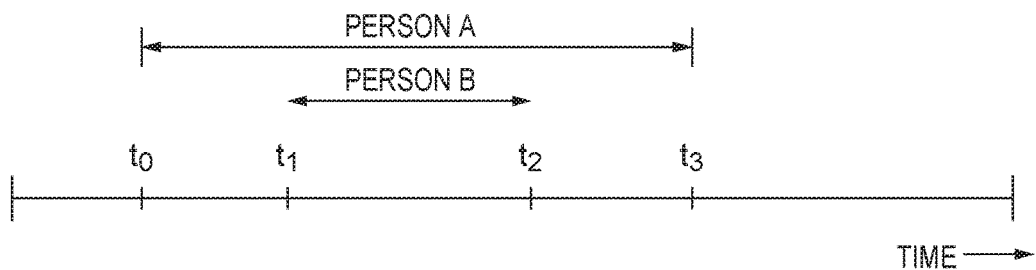
FIG. 6 is a view showing examples of the start and end timings of object tracking according to the embodiment.
FIG. 7 is a view showing an example of the structure of a collation database according to the embodiment.

If the face of person A is detected for the first time at time t0 while video frames are received from the network cameras in FIG. 6, an object ID is issued for person A, and object tracking information of person A is generated. After that, a process of tracking person A is performed until time T3 at which person A becomes untrackable. During this process, if the face of another person B is detected for the first time in the same imaging field at time t1, an object ID is issued for person B, and object tracking information of person B is generated. A process of tracking person B is performed until time t2 at which person B becomes untrackable.

Next, the storage process of the image feature storage unit 202 will be explained with reference to FIG. 5. This storage process is performed when the process of tracking the face of a given person is terminated as already explained.

Figure 5:
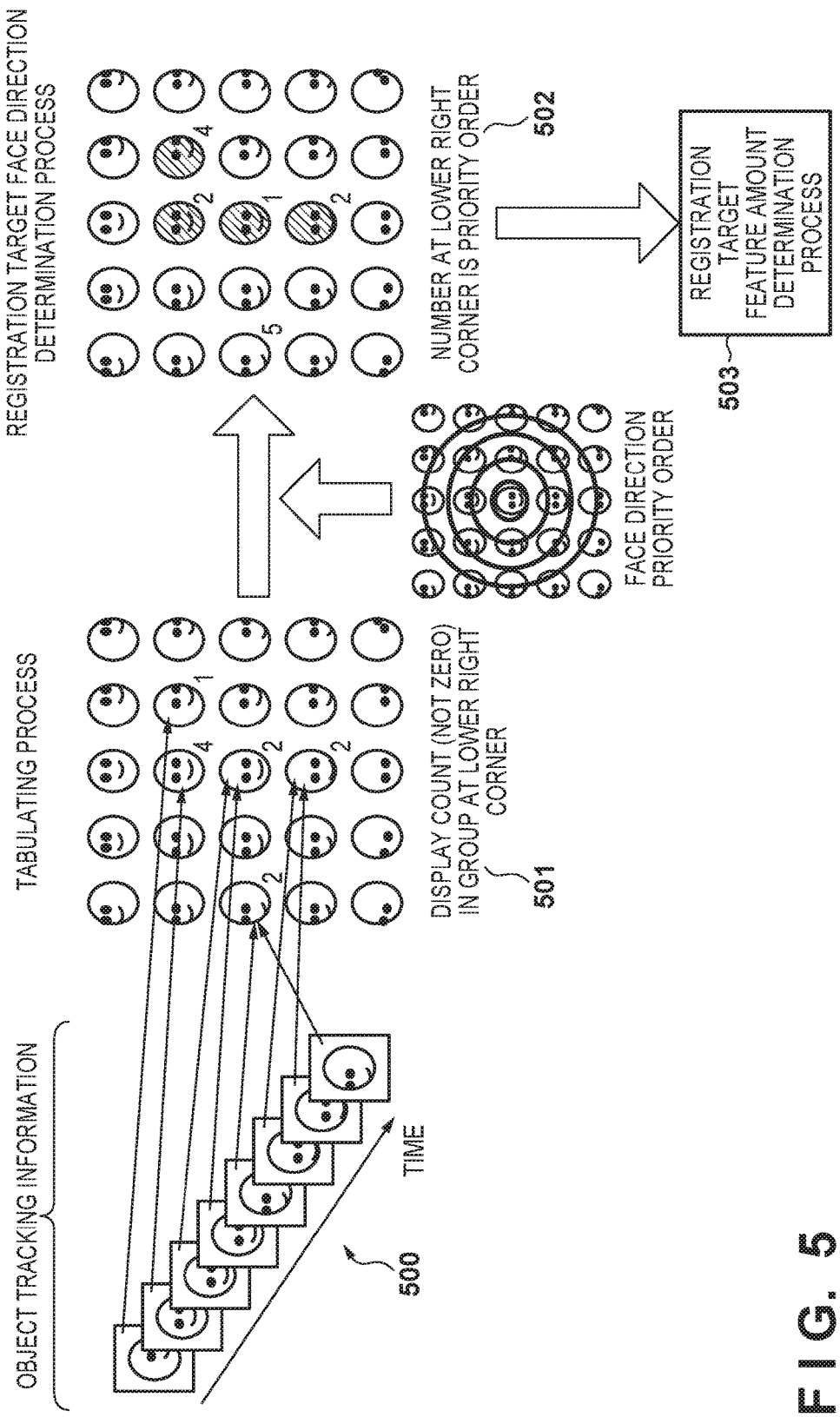
FIG. 5 is a view for explaining processing of an image feature amount storage unit according to the embodiment.

Reference numeral 500 in FIG. 5 represents the time transition of face direction pattern numbers stored in the object tracking information. Note that FIG. 5 shows an example in which the total number of face direction pattern numbers stored in the object tracking information is 6, in order to simplify the explanation.

First, the image feature storage unit 202 performs a process of tabulating the counts of appearances of the face direction pattern numbers stored in the object tracking information. Reference numeral 501 in FIG. 5 denotes tabulation results. A number at the lower right corner of each face pattern represents the count of appearances (an accumulated count).

Since the face direction pattern numbers are 1 to 25 as shown in FIG. 3B, the tabulation results of the face direction IDs are represented by variables F (face direction pattern numbers). In this embodiment, a maximum of four face direction feature amounts are registered in the collation DB with respect to a tracking target face. Also, a maximum of two feature amounts are registered in the collation DB with respect to one face direction. Each number is of course an example and can be larger than that.

In the embodiment, priority orders are set for the face direction pattern numbers in order of numbers (see FIG. 3B). The image feature storage unit 202 checks tabulated variables $F(1)$ to $F(25)$ in this order, and finds first four variables for which the appearance count is not zero (1 or more). In FIG. 5, $F(1)$, $F(2)$, $F(3)$, and $F(6)$ indicated by the oblique lines are the first four variables as denoted by reference numeral 502. That is, feature amounts for which face direction pattern numbers=1, 2, 3, and 6 in the object tracking information are determined as candidates to be registered in the collation DB.

Appearance count $F(1)$ of face direction pattern number "1" is "1". That is, only one feature amount of face direction pattern number "1" exists in the object tracking information. Therefore, the image feature storage unit 202 registers, in the collation DB, a feature amount for which the face direction pattern number is "1" in the object tracking information.

Also, appearance count $F(2)$ of face direction pattern number "2" is "4", so it is determined that two out of the four are registered. In the embodiment, the feature amounts of faces having larger sizes among the four faces are registered. This is so because a large face demonstrates that the distance between the person and the camera is short when capturing an image of the face of the person, so high accuracy can be expected. This similarly applies to face direction pattern numbers=3 and 6.

Consequently, the feature amounts of four face directions are registered in the collation DB for one object ID, and a maximum of two feature amounts are registered for one face direction. In addition, the possibility that the feature amount of a face is registered can be increased when the face direction is not a duplicate of another and the face is closer to a frontal face. Furthermore, a feature amount to be registered is given a higher priority order as the size of the face increases. Accordingly, an accurate matching process can be expected.

FIG. 7 shows an example of the structure of the collation DB according to the embodiment. This collation DB is secured in the external storage device 104. As shown in FIG. 7, one record in the collation DB includes fields for storing the object ID, (a maximum of four) feature amounts, the camera ID, the first frame number (time) of a period in which a face having the feature amount of a registered face is detected, the coordinates, and the face size. Of these data, the feature amount is used as a search key.

Figure 8:
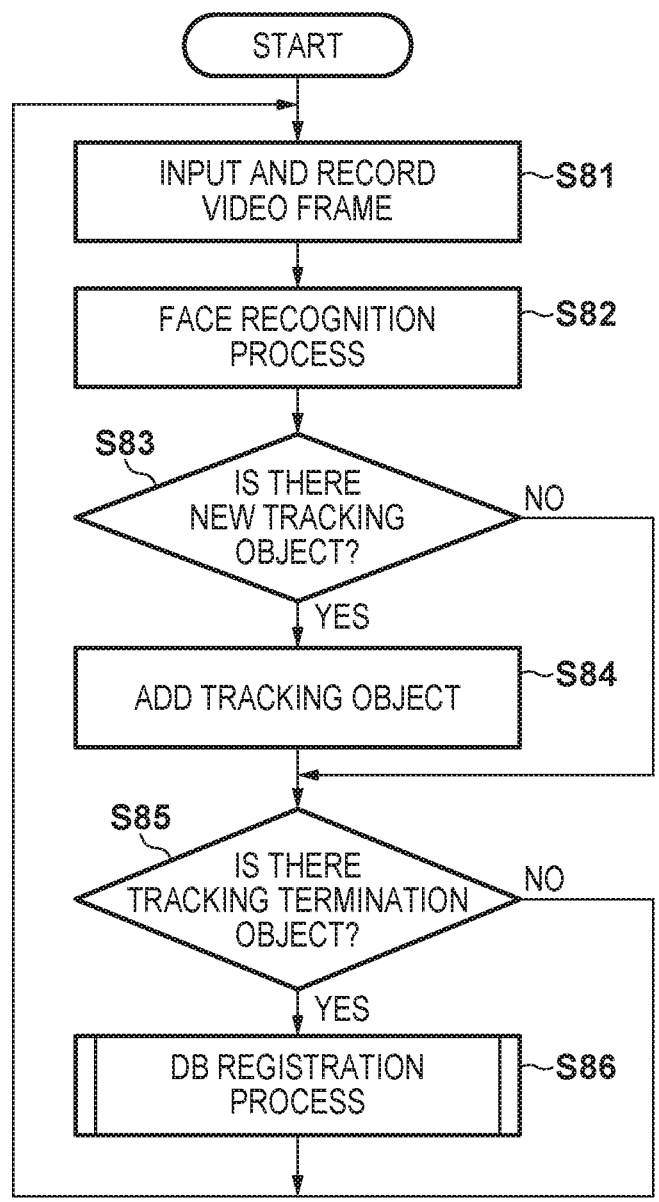
FIG. 8 is a flowchart showing a video storage process according to the first embodiment.

Based on the above explanation, the main processing of video recording according to the embodiment will be explained with reference to a flowchart shown in FIG. 8. The processing control unit 211 performs this processing.

In step S81, the control processing unit 211 receives video frames rom the network cameras 112a to 112c via the communication interface 111, and records them as moving image files of collation targets in the external storage device 104. The file names of three moving image files formed in this step are, for example, the camera IDs.

Then, the control processing unit 211 transfers the present video frame to the face detecting unit 206, and causes the face recognizing unit 206 to execute a face recognition process. As a consequence, the recognition result of each face existing in the video frame can be obtained. From the recognition results of the present video frame and the recognition results of an immediately preceding video frame, the control processing unit 211 determines whether an untracked face exists in the present video frame. If an untracked face exists, the process advances to step S84. In step S84, the control processing unit 211 gives the tracking processing unit 205 the tracking start instruction information containing, as arguments, the position and size of the new face to be tracked, a new object ID, the camera ID, and the frame number. Consequently, the tracking processing unit 205 forms object tracking information as shown in FIG. 4, and performs the process of tracking the face.

On the other hand, in step S85, the control processing unit 211 determines whether a tracking termination notification is received from the tracking processing unit 205. If no tracking termination notification is received, the control processing unit 211 repeats the processing from step S81. If a tracking termination notification is received, the process advances to step S86, and the control processing unit 211 transfers the object tracking information having undergone tracking to the image feature storage unit 202, and causes the image feature storage unit 202 to perform the process of registering the information in the collation DB. After this registration process, the control processing unit 211 deletes the object tracking information used in registration to the collation DB, and performs the processing from step S81.

Figure 9:
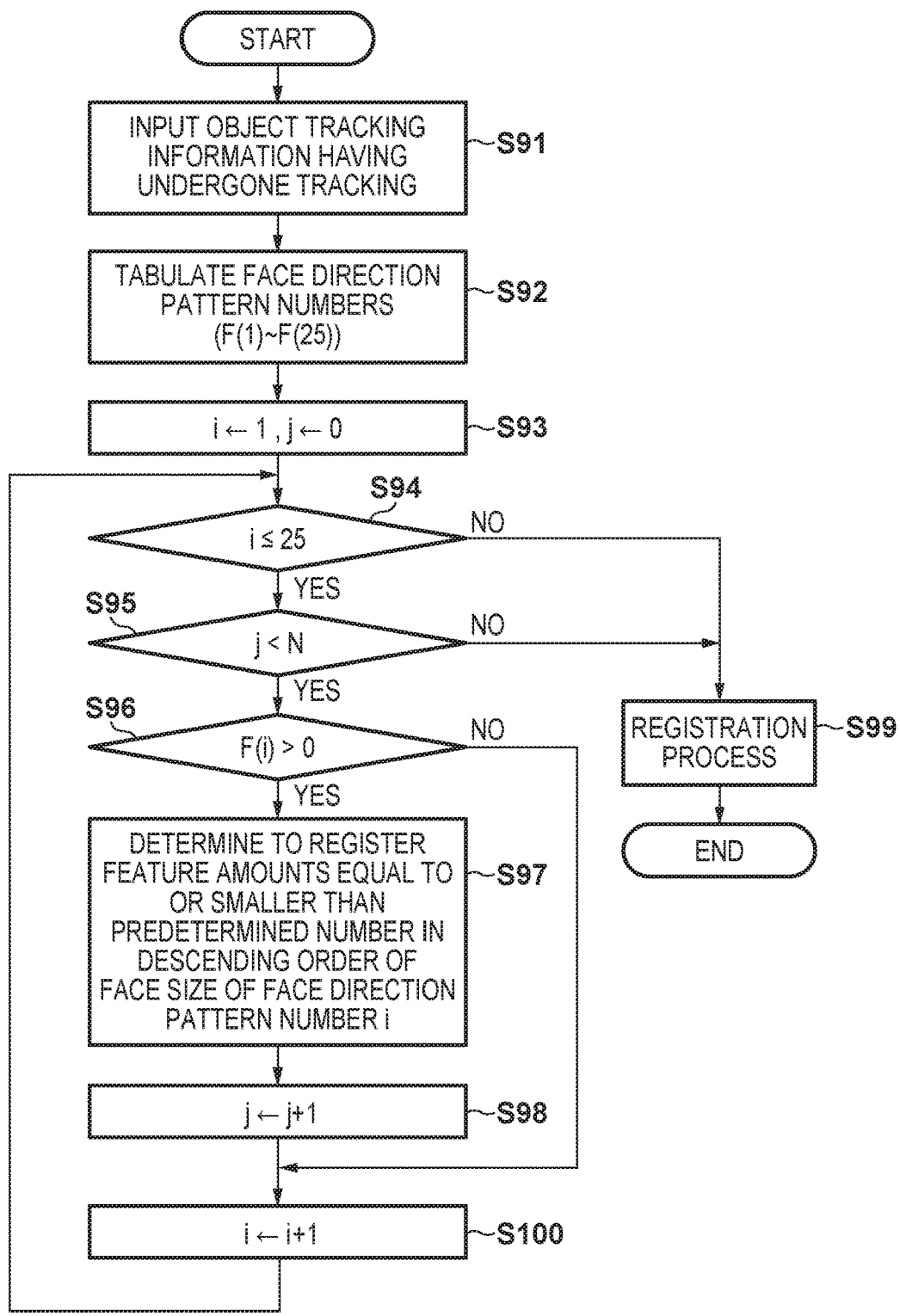
FIG. 9 is a flowchart showing a DB registration process shown in FIG. 8.

Next, the DB registration process (the processing of the image feature storage unit 202) in step S86 will be explained with reference to a flowchart shown in FIG. 9.

In step S91, the image feature storage unit 202 receives the object tracking information from the control processing unit 211. Then, the image feature storage unit 202 analyzes the received object tracking information, and performs a face direction pattern number tabulating process. That is, the image feature storage unit 202 obtains appearance counts F(1) to F(25) of face direction pattern numbers 1 to 25.

Subsequently, the image feature storage unit 202 initializes the variable i to 1 and a variable j to 0 in step S93. The variable i is a variable for specifying appearance count F( ) and the variable j is a variable for counting feature amounts to be registered.

In step S94, the image feature storage unit 202 compares the variable i with 25. If the variable i is 25 or less, not all appearance counts F( ) have been checked. Therefore, the image feature storage unit 202 advances the process to step S95, and compares the variable j with a feature amount upper-limiting number N (in the embodiment, N=4) which is preset to be registered in the collation DB. If j<N, the number of feature amounts to be registered in the collation DB has not reached the upper-limiting number, so the image feature storage unit 202 advances the process to step S96. In step S96, the image feature storage unit 202 determines whether appearance count F(i) for face direction pattern number i is not zero (1 or more). If appearance count F(i) is not zero, the image feature storage unit 202 advances the process to step S97, and determines a feature amount (in this embodiment, two or less) equal to or smaller than a predetermined number from feature amounts having larger face sizes among face direction pattern number=i, as a target to be registered in the collation DB. Since one registration target is determined, the image feature storage unit 202 performs a process of incrementing the variable j by 1 in step S98. Then, the image feature storage unit 202 performs a process of incrementing the variable i by 1 in step S100, and returns the process to step S94.

If the determination result in one of steps S94 and S95 is No, the image feature storage unit 202 advances the process to step S99. In step S99, the image feature storage unit 202 registers, in the collation DB, the feature amount determined as a registration target together with the object ID, frame number, camera ID, position, and size information, and terminates this process. Note that the variable i can become 25 before the variable j reaches N. In this case, the number of feature amounts to be registered is less than 4.

Figure 10:
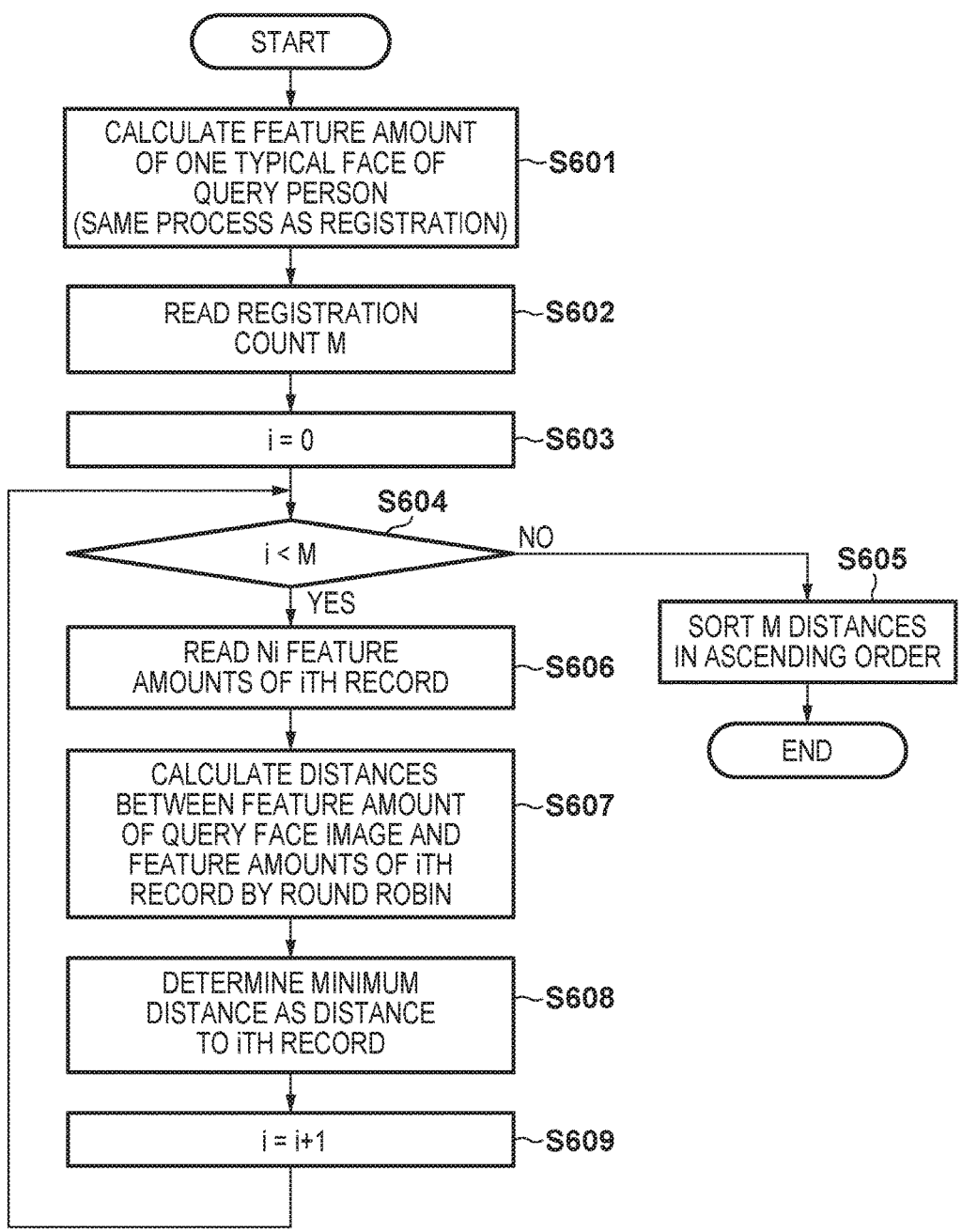
FIG. 10 is a flowchart showing a collation process according to the first embodiment.

The foregoing is the video data & feature amount registration process according to this embodiment. The collation process according to this embodiment will now be explained. The collation process is implemented by a query video input unit 203, the face recognizing unit 206, a face feature collating unit 210, a collation result display unit 204, and the control processing unit 211 which controls these units. The collation process will be explained with reference to a flowchart shown in FIG. 10.

First, in step S601, the control processing unit 211 instructs the query video input unit 203 to input a query video. An input source of the query video can be any input source. For example, it is possible to connect a portable terminal owned by a search client to this apparatus, and transfer an image showing the face of a person as a search target as a query video to this apparatus. Note that when this apparatus is connected to the Internet, the apparatus can receive the query video in the form of mail. When the query video is input any way, the control processing unit 211 performs a process of specifying the face of a query person. For example, the control processing unit 211 causes the face detecting unit 206 to detect all faces existing in the query video, displays the detected faces on the display device by adding a rectangular frame to each face, and allows the search client to select one face as a search target face image (query face image). Note that if only one face is detected, it is possible to unconditionally process the detected face as a selected face. When the query face image is determined, the control processing unit 211 determines a feature amount extracted when detecting the query face image as a detection key.

Then, in step S602, the control processing unit 211 acquires a total number M (the number of records) of object IDs registered in the collation DB. The control processing unit 211 requests the face feature collating unit 210 to perform the collation process by using the acquired M and the feature amount of the query face image as arguments.

In step S603, the face feature collating unit 210 initializes the variable i to zero. In step S604, the face feature collating unit 210 determines whether the variable i is M or less. If i<M, collation with all records is not complete, so the process advances to step S606. In step S606, the face feature collating unit 210 reads the ith record from the collation DB, and reads Ni feature amounts stored in the record. In the embodiment, Ni is maximally 8 because a maximum of two feature amounts are registered for each of a maximum of four face directions. The face feature collating unit 210 calculates the distance between the feature amount of the query face image and each of the Ni feature amounts, and determines that a minimum one of the calculated distances is the distance between the query face image and a person's face having the object ID of the ith record. The face feature collating unit 210 stores a pair of the object ID and the determined distance in a predetermined area of the RAM 103. After that, in order to perform the collation process for the next record, the face feature collating unit 210 increments the variable i by "1", and returns the process to step S604.

When the above process is repeated and the comparison process for all the records is complete (if it is determined that variable i=M), the distances to all registered object IDs are stored in the RAM 103. In step S605, therefore, the face feature collating unit 210 sorts the distances stored in the RAM 103 in ascending order, and terminates this process.

As a post-process, the control processing unit 211 transfers the collation results to the collation result display unit 204, thereby performing a collation result display process. An example of the display method is to display a list showing a predetermined number of face images in ascending order of distance, and, if one of these face images is selected, start playback from the corresponding position in the moving image based on the frame number and camera ID corresponding to the face.

Note that in the above embodiment, if a plurality of face direction pattern numbers exist in one object tracking information, the feature amount of a maximum face size is determined as a registration target. However, the feature amount of a registration target may also be a condition other than the size. For example, it is possible to give priority to a face for which the degree of blur of a video frame is small, or make it difficult to register a face with closed eyes or a face with an open mouth.

Also, similar to a still-image camera, even a camera for capturing a moving image sometimes changes the shutter speed in accordance with the brightness of a place. Accordingly, a face image blur sometimes occurs in a dark place or due to the moving velocity of an object. This directly deteriorates the image feature amount or attribute information. A blur can be estimated as follows. That is, frequency components of a face image region are obtained, and the ratio of a low-frequency component to a high-frequency component is obtained. If the ratio of the low-frequency component exceeds a predetermined value, it is possible to determine that a blur has occurred. In addition, if the face has closed eyes, an open mouth, or the like, the image feature amount of the face component modifies, and an error may occur in the attribute information.

Furthermore, when determining the feature amount of a registration target by using a plurality of parameters such as the size, closed eyes, and a blur described above, it is possible to assume a space having coordinate axes of the types of these parameters, and obtain a distance in this coordinate space.

Also, face direction pattern numbers 2 to 9 are so arranged as to surround the central position, so they can be regarded as having the same level. Therefore, if a plurality of face direction pattern numbers for which the tabulation result is not zero exist in face direction pattern numbers 2 to 9, a process of determining the feature amount of a maximum size can be repeated until the registration number (in this embodiment, 4) is reached. However, a maximum of two feature amounts are registered for one face direction pattern number as described above. The above processing is similarly applicable to face direction pattern numbers 10 to 25.

In the above embodiment, a predetermined number is set to 2, and faces equal to or smaller than this predetermined number are selected for each face direction pattern, and the feature amounts of these faces are registered. However, this predetermined number may also be changed from one face direction pattern to another. For example, the predetermined number can be set at 4 for face direction pattern number 1, 3 for face direction pattern numbers 2 to 9, and 2 for face direction pattern numbers 10 to 25, that is, the predetermined number can be increased as a pattern becomes closer to a frontal face. In other words, the number of faces to be selected can be changed in accordance with a face direction pattern.

In this embodiment as has been explained above, only a predetermined number of feature amounts are registered for the same face direction, so it is possible to suppress the collation DB from being unnecessarily bloated. In addition, in this embodiment, the priority order is increased as the face direction becomes closer to that of a frontal face, and the abovementioned predetermined number of feature amounts having the priority order are registered in the collation DB. As a consequence, it is possible to further suppress the collation DB bloat, and register highly accurate feature amounts. Also, even for the same face direction, a feature amount which can be expected to have high accuracy on a condition such as the face size is registered. This makes it possible to increase the collation accuracy as well.

Note that the above embodiment shows an example in which faces are classified by the face directions and registered in the registration DB. However, it is also possible to register faces by classifying them into expressions (for example, a smiling face and crying face). That is, this embodiment is widely applicable to an arrangement in which faces extracted from an input video are classified into predetermined groups (for example, the face directions or expressions) and registered.

Note also that in the above embodiment, when tracking the face of a tracking target, the tracking processing unit 205 adds the feature amount and direction of the face to the object tracking information. In face recognition, however, it is only necessary to be able to determine whether an object is a human face. Therefore, it is also possible to perform simple face recognition, and, after tracking is complete, calculate a more accurate feature amount or face direction to be registered in the collation DB.

Furthermore, in the above embodiment, it is possible to detect the same person (a person having the same object ID) from each frame of an input video by using the tracking function of the tracking processing unit 205. However, it is also possible to detect the same person from an input video by identifying persons included in each frame of the input video based on, for example, face feature amounts extracted by the face feature amount extracting unit 209. That is, the tracking processing unit 205 is not an essential element in the above-described embodiment, and this embodiment is not limited to this.

Second Embodiment

The above-mentioned first embodiment is an example using one image as a query image to be input when performing the collation process. In the second embodiment, an example using a moving image as a query image will be explained. Note that the apparatus configuration is the same as that of the first embodiment, and a repetitive explanation thereof will be omitted.

Figure 11:
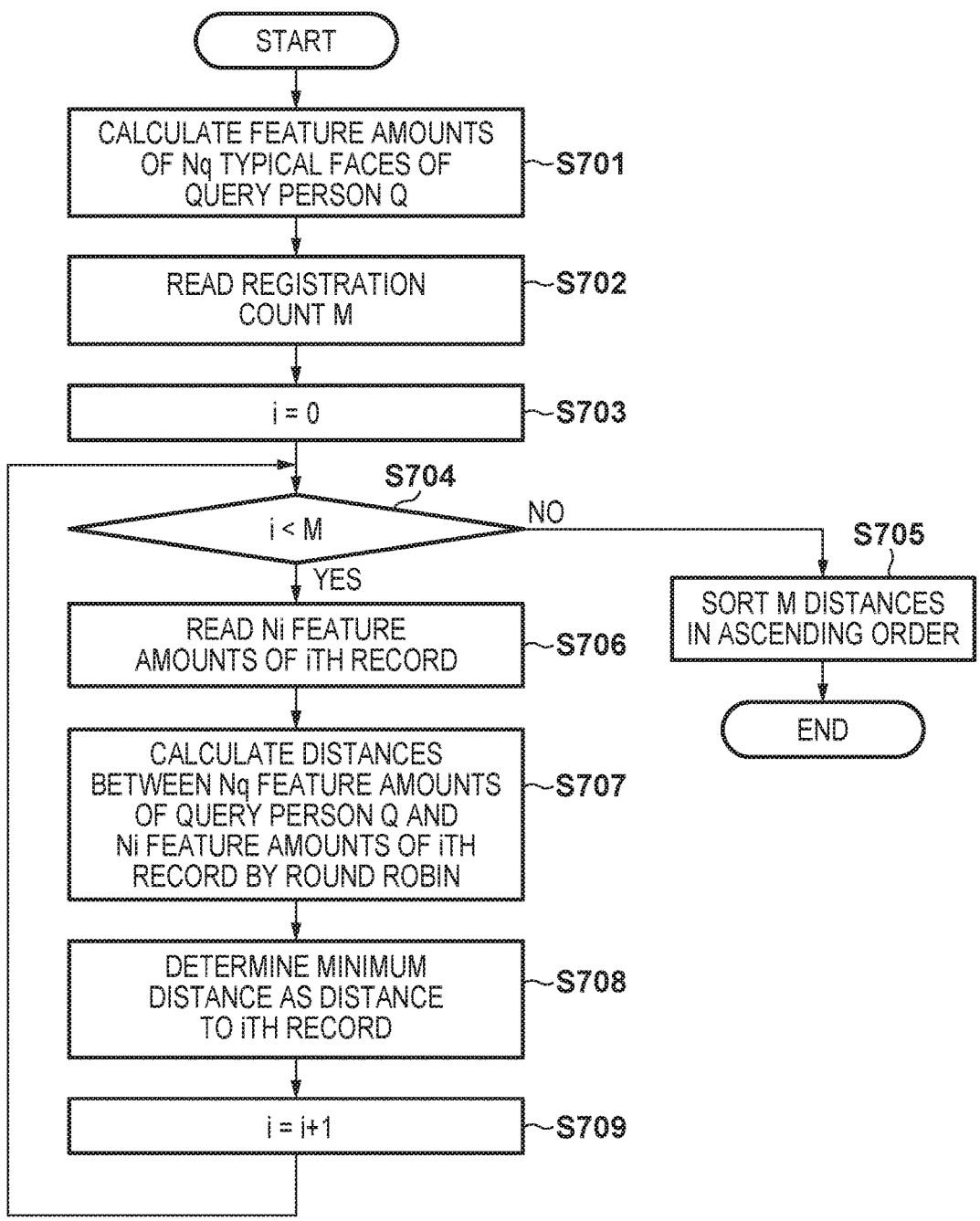
FIG. 11 is a flowchart showing a collation process according to the second embodiment.

A collation process according to the second embodiment will be explained below with reference to a flowchart shown in FIG. 11.

In step S701, a control processing unit 211 instructs a query video input unit 203 to input a query moving image video. An input source of the query moving image video can be any input source. For example, it is possible to connect a portable terminal owned by a search client to this apparatus, and transfer a moving image showing the face of a person as a search target as a query moving image to this apparatus. Note that when this apparatus is connected to the Internet, the apparatus can receive the query moving image in the form of mail. In some cases, it is also possible to visually find out a search target person from moving images stored and saved in this system, and designate the found person. This is equivalent to searching for the behavior of the person in another place (time).

When the query moving image is input any way, the control processing unit 211 performs a process of specifying the face of a query person. For example, the control processing unit 211 causes a face detecting unit 206 to detect all faces existing in the query video, displays the detected faces on a display device by adding a rectangular frame to each face, and allows the search client to select one face as a search target face image (query face image). Note that if only one face is detected, it is possible to unconditionally process the detected face as a selected face. When the query face image is determined, the control processing unit 211 tracks the query face image, classifies faces into face direction pattern numbers, and determines feature amounts one by one in ascending order of face direction pattern number, thereby determining a total of Nq feature amounts. Note that the number Nq of query feature amounts is preferably larger, but the collation time prolongs as the number increases. In this embodiment, Nq=4 as in registration to a collation DB.

Then, in step S702, the control processing unit 211 acquires a total number M (the number of records) of object IDs registered in the collation DB. The control processing unit 211 requests a face feature collating unit 210 to perform the collation process by using the acquired M and the feature amounts of the Nq query face images as arguments.

In step S703, the face feature collating unit 210 initializes a variable i to zero. In step S704, the face feature collating unit 210 determines whether the variable i is M or less. If i<M, collation with all records is not complete, so the process advances to step S706. In step S706, the face feature collating unit 210 reads the ith record from the collation DB, and reads Ni feature amounts stored in the record. In the embodiment, Ni is maximally 4 as already explained. In step S707, the face feature collating unit 210 calculates the distances between the Nq query feature amounts and the Ni feature amounts by round robin. In step S708, the face feature collating unit 210 determines that a minimum one of the calculated distances is the distance between the query face image and a person's face having the object ID of the ith record. The face feature collating unit 210 stores a pair of the object ID and the determined distance in a predetermined area of a RAM 103. After that, in order to perform the collation process for the next record, the face feature collating unit 210 increments the variable i by "1", and returns the process to step S704.

When the above process is repeated and the comparison process for all the records is complete (if it is determined that variable i=M), the distances to all registered object IDs are stored in the RAM 103. In step S705, therefore, the face feature collating unit 210 sorts the distances stored in the RAM 103 in ascending order, and terminates this process.

As a result, the second embodiment can reduce the information amount to be registered while suppressing deterioration of the accuracy. In addition, a plurality of typical faces are used not only in registration but also in search. This makes it possible to increase the probability that the query and a registered face are collated by the same face direction.

Third Embodiment

The third embodiment is an example of capturing an image of the same person as a query by using a plurality of cameras. Since the accuracy of person search depends on the face direction, a plurality of cameras are installed at different viewing angles, and images having a plurality of face directions are obtained.

In this case, the face of a query person is imaged in a plurality of different directions, and this promises to obtain a plurality of face direction patterns by performing imaging once. In this process, an arrangement of designating the same person as a query person in each individual captured image is used, and the feature amount and direction of each face need only be obtained. Since these features are apparent from the explanation so far, a repetitive explanation thereof will be omitted. Note that if it is promised that an image of one person need only be captured, the arrangement of designating a person can be omitted.

The third embodiment can reduce the information amount to be registered while suppressing deterioration of the accuracy. In addition, a query person is imaged by using a plurality of cameras having different viewing angles. The use of a plurality of typical faces makes it possible to increase the probability that the query and a registered face are collated by the same face direction.

Fourth Embodiment

The fourth embodiment is an example of capturing a moving image of the same person as the face of a query person by using a plurality of cameras.

Since the accuracy of person search depends on the face direction, a plurality of cameras are installed at different viewing angles, and moving images containing a plurality of face directions are obtained. When the number of cameras is M, therefore, M moving images are obtained. In the second embodiment, the feature amount of the face of a query person is obtained from one moving image. In the fourth embodiment, however, M moving images are input, and Nq query feature amounts are obtained by tabulating face direction pattern numbers in the M moving images. That is, step S91 shown in FIG. 9 need only be performed M times, so an explanation thereof will be omitted.

As a result, it is possible to reduce the information amount to be registered while suppressing deterioration of the accuracy. In addition, when performing search, a moving image of a query person is captured by using a plurality of cameras having different viewing angles. Since very many typical faces are used, the probability that the query and a registered face are collated by the same face direction can be increased.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-155391, filed Aug. 5, 2015, which is hereby incorporated by reference herein in its entirety.

What is claimed is:

1. An information processing apparatus comprising:
one or more processors; and
at least one memory storing instructions thereon that, when executed by the one or more processors, cause the information processing apparatus to:
acquire video data;
detect at least one face of the same person from a plurality of frames of the acquired video data;
classify the detected face into one of a plurality of predetermined groups;
select, from the faces classified into the groups, not more than a first predetermined number of faces for each group, wherein the first predetermined number is an integer of not less than 2; and
register feature amounts of the selected faces in a collation database.

2. The apparatus according to claim 1, wherein the at least one memory further stores instructions thereon that, when executed by the one or more processors, cause the information processing apparatus to select not more than the first predetermined number of faces based on at least one of a size, a blur, closed eyes, and an open mouth of a face.

3. The apparatus according to claim 1, wherein the at least one memory further stores instructions thereon that, when executed by the one or more processors, cause the information processing apparatus to detect the face of the same person from the plurality of frames by tracking a face detected in a given frame in the video data.

4. The apparatus according to claim 1, wherein the group is a face direction of a person.

5. The apparatus according to claim 1, wherein the first predetermined number set for a first group of the plurality of groups and the first predetermined number set for a second group have different values.

6. The apparatus according to claim 1, wherein the at least one memory further stores instructions thereon that, when executed by the one or more processors, cause the information processing apparatus to select not more than a second predetermined number of groups from the plurality of groups based on priority, and selects not more than the first predetermined number of faces for each of not more than the second predetermined number of selected groups, wherein the priority is preset for the plurality of groups.

7. The apparatus according to claim 6,
wherein the group is a face direction of a person, and
wherein the larger a deviation of the face direction of a group from that of a frontal face, the lower the priority.

8. The apparatus according to claim 1, wherein the at least one memory further stores instructions thereon that, when executed by the one or more processors, cause the information processing apparatus to collate a feature amount extracted from a query image of a target person with a feature amount registered in the collation database.

9. The apparatus according to claim 8, wherein the at least one memory further stores instructions thereon that, when executed by the one or more processors, cause the information processing apparatus to:
input query video data of a target person, and
perform collation based on a feature amount of the query image of the target person extracted from the query video data.

10. The apparatus according to claim 9, wherein the at least one memory further stores instructions thereon that, when executed by the one or more processors, cause the information processing apparatus to input a plurality of query images of a target person, and
wherein the collation unit classifies the plurality of query images into face directions, determines one feature amount for one face direction, and performs collation by using the feature amount determined for each face direction.

11. The apparatus according to claim 9, wherein the at least one memory further stores instructions thereon that, when executed by the one or more processors, cause the information processing apparatus to input a plurality of query images obtained by capturing an image of a face of a target person in a plurality of directions, and
wherein the collation unit performs collation by using feature amounts obtained from the plurality of input query images.

12. The apparatus according to claim 8, further comprising a display configured to cause display of an obtained collation result.

13. The apparatus according to claim 8, wherein the at least one memory further stores instructions thereon that, when executed by the one or more processors, cause the information processing apparatus to:
register a feature amount pertaining to a feature point of a face component in the collation database, and
collate a feature amount pertaining to a feature point of a face component extracted from the query image of the target person with the feature amount pertaining to the feature point of the face component registered in the collation database.

14. A control method comprising:
acquiring video data by an information processing apparatus;
detecting at least one face of the same person from a plurality of frames of the acquired video data;
classifying the detected face into one of a plurality of predetermined groups;

selecting, from the faces classified into the groups, not more than a first predetermined number of faces for each group, wherein the first predetermined number is an integer of not less than 2; and registering feature amounts of the selected faces in a collation database.

15. A non-transitory computer-readable recording medium that stores a program for causing a computer to execute steps of a control method comprising:

acquiring video data by the computer;

detecting at least one face of the same person from a plurality of frames of the acquired video data;

classifying the detected face into one of a plurality of predetermined groups;

selecting, from the faces classified into the groups, not more than a first predetermined number of faces for each group, wherein the first predetermined number is an integer of not less than 2; and registering feature amounts of the selected faces in a collation database.

* * * * *